United States Patent
Min

(10) Patent No.: US 9,931,992 B2
(45) Date of Patent: Apr. 3, 2018

(54) MOUNTING ASSEMBLY FOR VEHICLE ROOF-BOX

(71) Applicants: KH-TECH CO., LTD., Siheung-si (KR); Kil Hong Min, Gwacheon-si (KR)

(72) Inventor: Kil Hong Min, Gwacheon-si (KR)

(73) Assignee: KH-TECH CO., LTD., Siheung-si (KR)

( * ) Notice: Subject to any disclaimer, the term of this patent is extended or adjusted under 35 U.S.C. 154(b) by 0 days.

(21) Appl. No.: 15/319,096

(22) PCT Filed: Jul. 22, 2016

(86) PCT No.: PCT/KR2016/008005
§ 371 (c)(1),
(2) Date: Dec. 15, 2016

(87) PCT Pub. No.: WO2017/026695
PCT Pub. Date: Feb. 16, 2017

(65) Prior Publication Data
US 2017/0203698 A1    Jul. 20, 2017

(30) Foreign Application Priority Data

Aug. 12, 2015  (KR) .................. 10-2015-0113960
Jan. 12, 2016  (KR) .................. 10-2016-0003623

(51) Int. Cl.
*B60R 9/04*    (2006.01)
*B60R 9/055*   (2006.01)

(52) U.S. Cl.
CPC ................... *B60R 9/055* (2013.01)

(58) Field of Classification Search
CPC ........ B60R 9/04; B60R 2011/04; B60R 9/045
(Continued)

(56) References Cited

U.S. PATENT DOCUMENTS 4,239,139 A * 12/1980 Bott ................... B60R 9/045
                                                              224/324
4,245,764 A *  1/1981 Kowalski ............ B60R 9/045
                                                              224/321

(Continued)

FOREIGN PATENT DOCUMENTS

KR    1998-031149 U     8/1998
KR    2003-0033306      5/2003
(Continued)

*Primary Examiner* — Brian D Nash
(74) *Attorney, Agent, or Firm* — KORUS Patent, LLC; Seong Il Jeong

(57) ABSTRACT

An assembly for mounting a vehicle roof-box on a vehicle roof panel comprises a pair of roof rails disposed on the vehicle roof panel at both sides thereof respectively in a front-rear direction of the vehicle roof panel; a plurality of cross-bars spacedly arranged in the front-rear direction, wherein each cross-bar has two opposing ends removably coupled to the roof rails respectively, wherein the vehicle roof-box is mounted to the cross-bars; and a plurality of securing means configured to removably secure the cross-bars to the roof rails, wherein each of the plurality of securing means includes a first bracket movable along each of the roof rails, and a second bracket screw-coupled to the first bracket to secure the first bracket to each of the roof rails, wherein an end of each of the cross-bars is fixed to the second bracket.

6 Claims, 5 Drawing Sheets

(58) Field of Classification Search
USPC .............. 224/309, 495, 511, 537, 533, 317
See application file for complete search history.

(56) References Cited

U.S. PATENT DOCUMENTS

| | | | | |
|---|---|---|---|---|
| 4,269,340 A * | 5/1981 | Kowalski | ............... | B60R 9/045 224/321 |
| 4,433,804 A * | 2/1984 | Bott | ................ | B60R 9/055 224/321 |
| 4,473,178 A * | 9/1984 | Bott | ................ | B60R 9/045 224/321 |
| 4,489,868 A * | 12/1984 | Thirion | ................ | B60R 9/045 224/321 |
| 5,069,377 A * | 12/1991 | Baughman | ............... | B60R 9/00 224/321 |
| 5,207,366 A * | 5/1993 | Cucheran | ................ | B60R 9/04 224/309 |
| 5,538,169 A * | 7/1996 | Moore | ................ | A45C 15/00 190/109 |
| 5,573,161 A * | 11/1996 | Stapleton | ............... | B60R 9/045 224/309 |
| 5,713,498 A * | 2/1998 | Cucci | ................ | B60R 9/055 224/309 |
| 5,794,826 A * | 8/1998 | Cronce | ................ | B60R 9/045 116/200 |
| 6,286,739 B1 * | 9/2001 | Stapleton | ............... | B60R 9/045 224/309 |
| 6,308,874 B1 * | 10/2001 | Kim | ................ | B60R 9/042 224/309 |
| 6,811,066 B2 * | 11/2004 | Aftanas | ............... | B60R 9/045 224/321 |
| 7,422,130 B2 * | 9/2008 | Shaukat | ............... | B60R 9/04 224/309 |
| 8,276,794 B2 * | 10/2012 | Aftanas | ............... | B60R 9/045 224/315 |
| 2006/0012096 A1 * | 1/2006 | Geldert | ................ | B25B 5/163 269/203 |
| 2008/0290123 A1 * | 11/2008 | Sprague | ............... | B60R 9/045 224/321 |
| 2010/0116858 A1 * | 5/2010 | Foley | ................ | B60R 9/055 224/315 |
| 2014/0097218 A1 * | 4/2014 | Bittner | ................ | B60R 9/04 224/309 |

FOREIGN PATENT DOCUMENTS

| | | |
|---|---|---|
| KR | 10-2005-0024691 A | 3/2005 |
| KR | 20-0413213 Y1 | 3/2006 |

* cited by examiner

MOUNTING ASSEMBLY FOR VEHICLE ROOF-BOX

BACKGROUND

Field of the Present Disclosure

The present disclosure relates to a mounting assembly for a vehicle roof-box, and, more particularly, to a mounting assembly for a vehicle roof-box wherein a vehicle roof-box is easily installed into the vehicle roof panel without damaging the vehicle roof panel and roof rails, and a space between the vehicle roof-box and vehicle roof panel is blocked.

Discussion of Related Art

A space such as a trunk is provided in the passenger vehicle or the shipping vehicle for transporting the goods. However, since the size of the space in which the article can be stored is limited, it is difficult to store the article when the number of articles to be stored is large or the size of the article to be stored is large.

Accordingly, the roof panel of the vehicle is provided with a separate carrier such as a roof box or a roof carrier, so that the goods to be transported can be properly loaded and transported therein.

Especially in recent years, leisure and camping population is increasing, and, thus, there are many vehicles equipped with external mounting means on the roof panel of the vehicle to transport the equipment and articles.

As the external mounting means, the carrier is loaded with the article exposed to the outside. Thus, there is a disadvantage that the article may be damaged during drive of the vehicle and the air resistance may be increased. Therefore, the roof box may be used.

In order to mount the carrier or the roof box, the car maker sometimes ships the vehicle with the pair of roof rails attached to the longitudinal direction of the roof panel of the vehicle.

In order to mount the roof box, two crossbars are fixedly installed in the front and rear direction of the roof rail, and a roof box is mounted on the crossbars. In order to fix the cross bar to the roof rail, a groove is formed or a hole is drilled in a roof rail. Then, the cross bar is mounted by fastening a bracket or a fixing member such as bolts and nuts into the groove or hole.

Therefore, the damage to the rail may be inevitable. In order to replace the roof box with a roof box having a different size, it is necessary to form another holes or grooves.

When the roof rail is formed with many grooves or holes, the structural strength of the roof rail is reduced so much that it is difficult to firmly support the roof box. As a result, grooves or holes can cause noise during the vehicle is running.

As means for reducing the air resistance during running of the vehicle, the front portion and the rear portion of the roof surface of the vehicle are made lower in a structure than the central portion thereof.

Due to the structure of the roof panel of such a vehicle, the roof rail is formed to have a length shorter than the entire length of the roof panel, and the two crossbars fixed to the roof rail are spaced apart from the front and rear ends of the roof panel. A space is formed between the front and rear portions of the roof box and the surface of the roof panel.

If the space is formed in such a state that the front and rear portions of the roof box are not fixed, air is introduced into the space between the bottom surface of the roof box and the roof panel of the vehicle when the vehicle is traveling, thereby causing noise.

In addition, the cross bar is installed on the roof rail, and, thus, a gap is formed between the cross bar and the roof panel. Therefore, when the vehicle travels, the air passes through the gap and causes noise.

In addition, the air resistance during the driving of the vehicle may increase, which may cause problems in safety driving, and the fuel consumption of the vehicle also increases due to the air resistance.

To solve the problems in a conventional approach, the roof rail is in close contact with the roof panel. However, a space is formed between the cross bar and the roof panel and a space is formed between the roof box installed to the cross bar and the roof panel. Furthermore, this may be true for the front and rear portions of the roof box.

SUMMARY

The present disclosure is to provide a mounting assembly for a vehicle roof-box wherein a vehicle roof-box is easily installed into the vehicle roof panel without damaging the vehicle roof panel and roof rails, a space between a bottom face of each of front and rear portions of the vehicle roof-box and the vehicle roof panel is minimized.

In one aspect of the present disclosure, there is provided an assembly for mounting a vehicle roof-box on a vehicle roof panel, the assembly comprising: a pair of roof rails disposed on the vehicle roof panel at both sides thereof respectively in a front-rear direction of the vehicle roof panel; a plurality of cross-bars spacedly arranged in the front-rear direction, wherein each cross-bar has two opposing ends removably coupled to the roof rails respectively, wherein the vehicle roof-box is mounted to the cross-bars; and a plurality of securing means configured to removably secure the cross-bars to the roof rails, wherein a bottom face curvature of each of the cross-bars is substantially the same as a surface curvature of the vehicle roof panel, wherein the cross-bars tightly-contact the vehicle roof panel, wherein each of the plurality of securing means includes a first bracket movable along each of the roof rails, and a second bracket screw-coupled to the first bracket to secure the first bracket to each of the roof rails, wherein an end of each of the cross-bars is fixed to the second bracket, wherein a lower portion of the vehicle roof-box contacts the second bracket and first bracket such that joints between the plurality of securing means and the plurality of cross-bars are not exposed to an ambient air.

In one implementation, each of the cross-bars secured to the roof rails at a front and/or rear portion thereof includes a reinforcement support to support a front and/or rear end of the vehicle roof-box.

In one implementation, protective pads are disposed beneath the cross-bars and the reinforcement supports, wherein each of the cross-bars has a fixing plate at each end of the bar, wherein the fixing plate face-contacts and is fixed to the second bracket.

In one implementation, the cross-bars include a front cross-bar secured to a front portion of each of the roof rails, a middle cross-bar secured to a middle portion of each of the roof rails, and a rear cross-bar secured to a rear portion of each of the roof rails.

In one implementation, the cross-bars and reinforcement supports have pins formed thereon, wherein the vehicle roof-box has holes defined therein to receive the pins, and knob handles disposed in the vehicle roof-box are screw-engaged with the pins.

In one aspect of the present disclosure, there is provided a assembly for mounting a vehicle roof-box on a vehicle roof panel, the assembly comprising: a pair of roof rails disposed on the vehicle roof panel at both sides thereof respectively in a front-rear direction of the vehicle roof panel; a plurality of cross-bars spacedly arranged in the front-rear direction, wherein each cross-bar has two opposing ends removably coupled to the roof rails respectively, wherein the vehicle roof-box is mounted to the cross-bars; a plurality of securing means configured to removably secure the cross-bars to the roof rails; and at least one reinforcement support to support a front and/or rear end of the vehicle roof-box, wherein each of the plurality of the securing means includes a first bracket hooked and supported on each of the roof rails at an outer portion thereof, and a second bracket hooked and supported on each of the roof rails at an inner portion thereof, wherein the second bracket is removably coupled to the first bracket via a fastener, wherein one of the first and second brackets has a groove and the other of the first and second brackets has a protrusion engaged with the groove, wherein a bottom face curvature of each of the cross-bars is substantially the same as a surface curvature of the vehicle roof panel, wherein the cross-bars tightly-contact the vehicle roof panel, wherein a bottom face curvature of each of the reinforcement supports is substantially the same as a surface curvature of the vehicle roof panel, wherein the reinforcement supports tightly-contact the vehicle roof panel.

In accordance with the present disclosure, the holes may not be formed in the roof rails themselves and, using the bracket, the cross-bars may be mounted, thereby to suppress reduction of strength of the roof rails.

The bottom face curvature of each of the cross-bars is substantially the same as a surface curvature of the vehicle roof panel, wherein the cross-bars tightly-contact the vehicle roof panel. The cross-bar has the fixing plate at each end of the bar, wherein the fixing plate face-contacts and is fixed to the bracket. Thus, the vehicle roof-box may be secured to the vehicle roof panel in a tightly-contacting manner.

The front cross-bar secured to a front portion of each of the roof rails, the middle cross-bar secured to a middle portion of each of the roof rails, and the rear cross-bar secured to a rear portion of each of the roof rails may allow strong securement of the vehicle roof-box. The reinforcement support to support a front and/or rear end of the vehicle roof-box may allow strong securement of the vehicle roof-box.

The cross-bars may tightly contact the vehicle roof panel, a gap between the vehicle roof panel and cross-bars may be removed, thereby to minimize the air resistance or a noise during the vehicle is running. The reinforcement supports may block a space between the vehicle roof-box and vehicle roof panel from an ambient air. Thus, when the vehicle is running, a noise may not be generated therein. A space between the vehicle roof-box and vehicle roof panel may be blocked by the reinforcement supports at the front and rear ends of the vehicle roof-box. A side face of the lower plate of the vehicle roof-box may contact the side face of the bracket. The lower plate of the vehicle roof-box may contact the top face of the bracket. Thus, during the vehicle is running, the air may be prevented from entering into between the lower plate of the vehicle roof-box and the bracket, thereby to remove or reduce a noise.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

Figure 1:
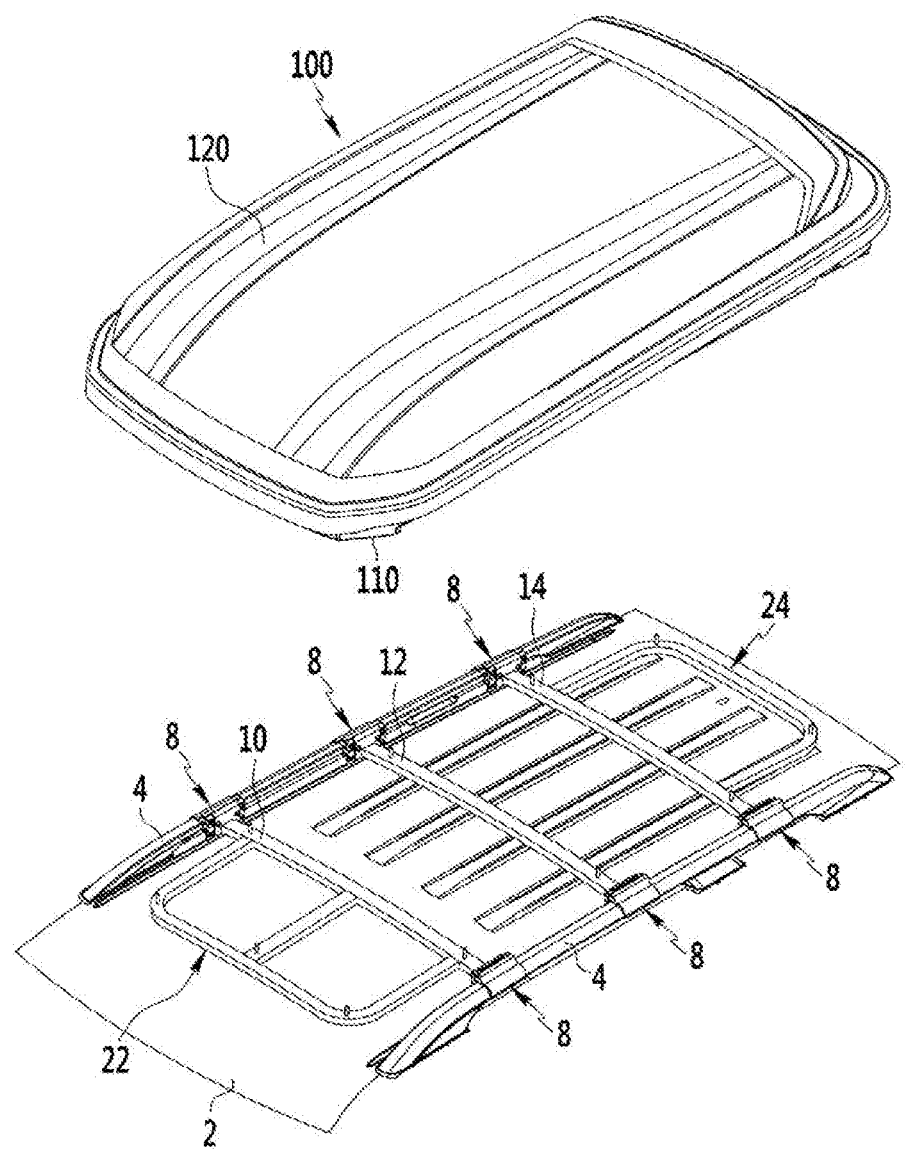
FIG. 1 is a perspective view of a state where a vehicle roof-box is separated from a mounting assembly for a vehicle roof-box in accordance with one embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTIONS

Example embodiments will be described in more detail with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Figure 2:
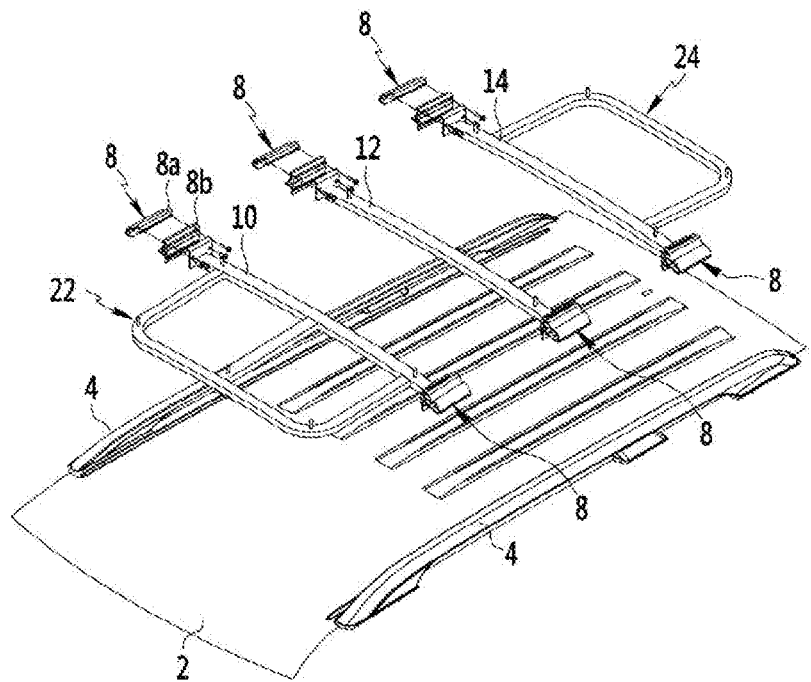
FIG. 2 is an exploded perspective view of a mounting assembly for a vehicle roof-box in accordance with one embodiment of the present disclosure.
Figure 3:
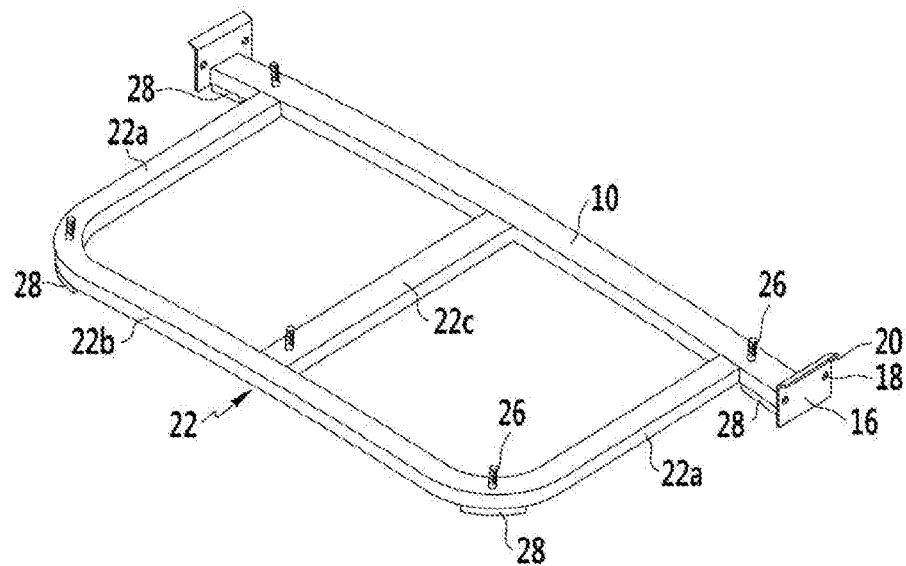
FIG. 3 is a perspective view of a front cross-bar of a mounting assembly for a vehicle roof-box in accordance with one embodiment of the present disclosure.
Figure 4:
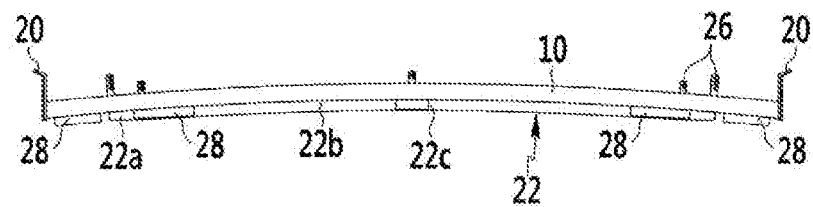
FIG. 4 is a rear view of a front cross-bar of a mounting assembly for a vehicle roof-box in accordance with one embodiment of the present disclosure.
Figure 5:
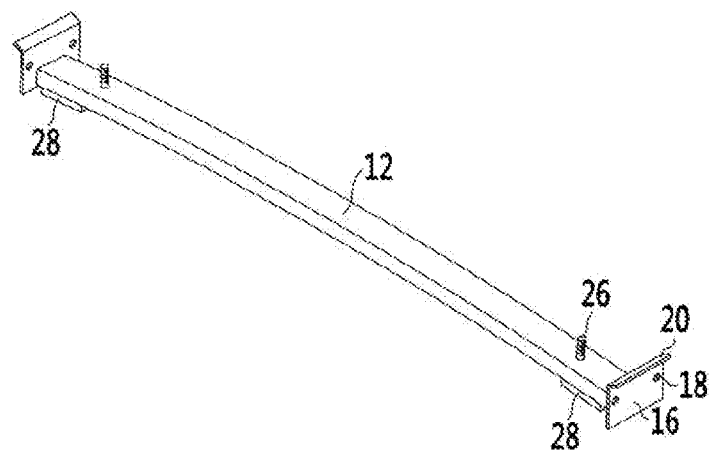
FIG. 5 is a perspective view of a middle cross-bar of a mounting assembly for a vehicle roof-box in accordance with one embodiment of the present disclosure.
Figure 6:
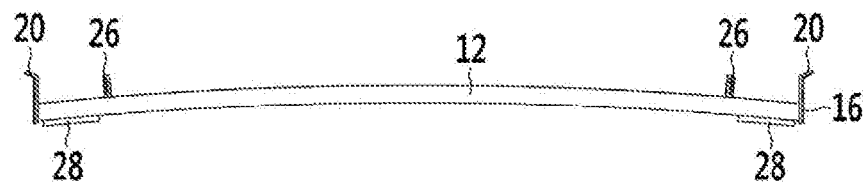
FIG. 6 is a rear view of a middle cross-bar of a mounting assembly for a vehicle roof-box in accordance with one embodiment of the present disclosure.
Figure 7:
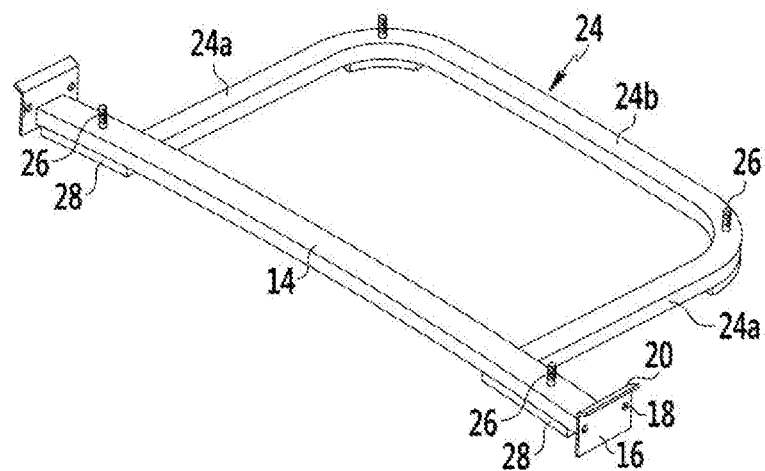
FIG. 7 is a perspective view of a rear cross-bar of a mounting assembly for a vehicle roof-box in accordance with one embodiment of the present disclosure.
Figure 8:
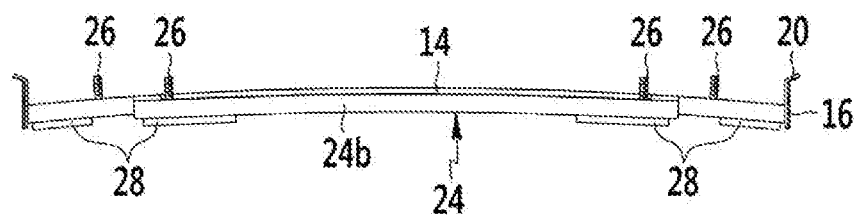
FIG. 8 is a rear view of a rear cross-bar of a mounting assembly for a vehicle roof-box in accordance with one embodiment of the present disclosure.
Figure 9:
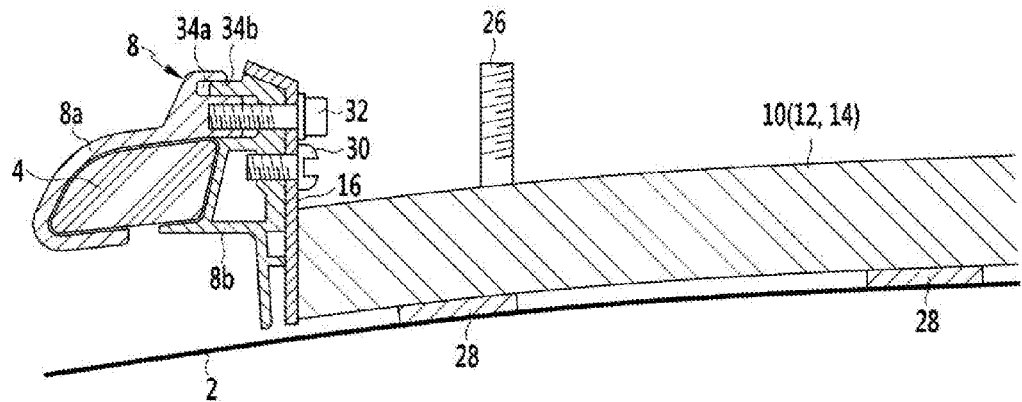
FIG. 9 is an enlarged partial cross-sectional view of a mounting assembly for a vehicle roof-box coupled to a vehicle roof panel, in accordance with one embodiment of the present disclosure.
Figure 10:
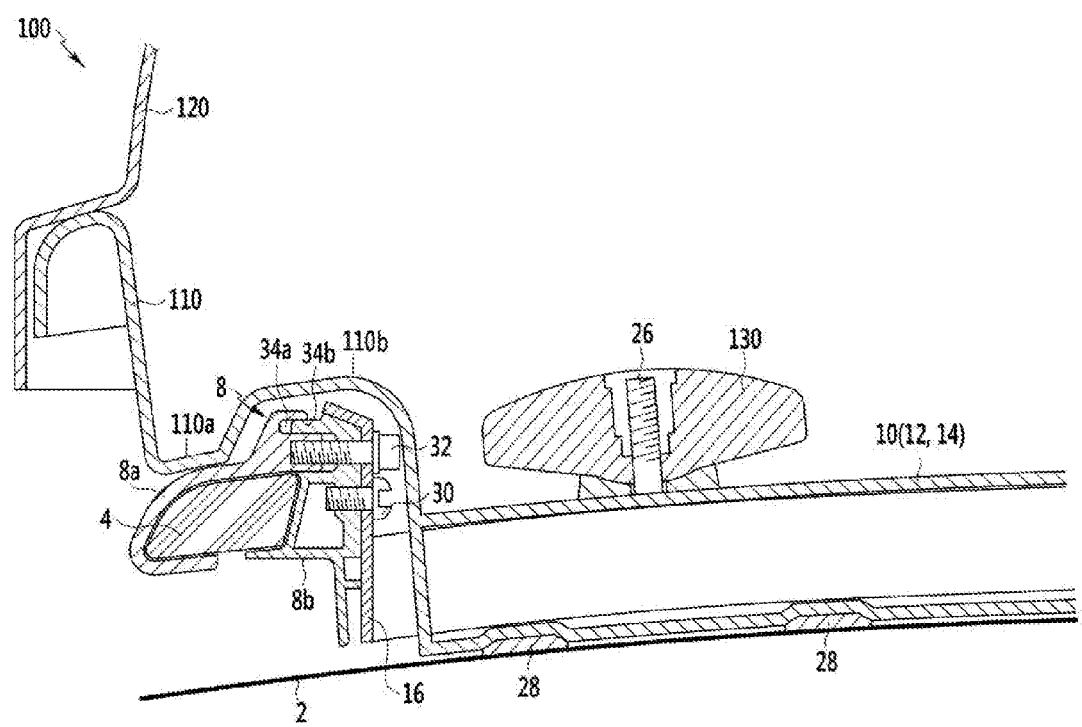
FIG. 10 is an enlarged partial cross-sectional view of a state where a vehicle roof-box is mounted to a mounting assembly for a vehicle roof-box in accordance with one embodiment of the present disclosure.

FIG. 1 is a perspective view of a state where a vehicle roof-box is separated from a mounting assembly for a vehicle roof-box in accordance with one embodiment of the present disclosure. FIG. 2 is an exploded perspective view of a mounting assembly for a vehicle roof-box in accordance with one embodiment of the present disclosure. FIG. 3 is a perspective view of a front cross-bar of a mounting assembly for a vehicle roof-box in accordance with one embodiment of the present disclosure. FIG. 4 is a rear view of a front cross-bar of a mounting assembly for a vehicle roof-box in accordance with one embodiment of the present disclosure. FIG. 5 is a perspective view of a middle cross-bar of a mounting assembly for a vehicle roof-box in accordance with one embodiment of the present disclosure. FIG. 6 is a rear view of a middle cross-bar of a mounting assembly for a vehicle roof-box in accordance with one embodiment of the present disclosure. FIG. 7 is a perspective view of a rear cross-bar of a mounting assembly for a vehicle roof-box in accordance with one embodiment of the present disclosure. FIG. 8 is a rear view of a rear cross-bar of a mounting assembly for a vehicle roof-box in accordance with one embodiment of the present disclosure. FIG. 9 is an enlarged partial cross-sectional view of a mounting assembly for a vehicle roof-box coupled to a vehicle roof panel, in accordance with one embodiment of the present disclosure. FIG. 10 is an enlarged partial cross-sectional view of a state where a vehicle roof-box is mounted to a mounting assembly for a vehicle roof-box in accordance with one embodiment of the present disclosure.

With the mounting assembly for a vehicle roof-box in accordance with one embodiment of the present disclosure, a reference numeral 2 may refer to a vehicle roof panel. For the sake of clarity, the vehicle body is not shown but only the vehicle roof panel is shown.

The mounting assembly for a vehicle roof-box in accordance with one embodiment of the present disclosure may include a pair of roof rails 4 mounted on the vehicle roof panel 2 at both sides respectively in a length direction of the panel, that is, in a front-rear direction of the vehicle panel; a plurality of cross-bars 10, 12, and 14, each bar having both opposing ends coupled to the two roof rails 4 respectively, wherein the vehicle roof-box 100 is mounted to the cross-bars 10, 12, and 14; and a plurality of securing means 8 to secure the cross-bars 10, 12 and 14 to the roof rails 4.

The vehicle roof-box 100 may include a lower plate 110 coupled to the cross-bars, and an upper plate 120 coupled to the lower plate to open or close a space defined between the lower and upper plates.

The vehicle roof panel 2 may be bent to have a predetermined curvature. Further, the roof rails 4 may be bend to have substantially the same curvature as the vehicle roof panel 2. Further, the roof rails 4 may tightly-contact the vehicle roof panel 2.

The roof rails 4 may be mounted to the roof panel when manufacturing the vehicle. Otherwise, the roof rails 4 may be separately mounted to the roof panel after manufacturing the vehicle.

The cross-bars 10, 12 and 14 may be spaced from each other. The cross-bars 10, 12 and 14 may be arranged in a length direction of the vehicle roof rails 4.

In one embodiment, the cross-bars may be include a front cross-bar 10 disposed at a front portion of the roof rails 4, a middle cross-bar 12 disposed at a middle portion of the roof rails 4, and a rear cross-bar 14 disposed at a rear portion of the roof rails 4.

Thus, the front cross-bar 10 disposed at a front portion of the roof rails 4, a middle cross-bar 12 disposed at a middle portion of the roof rails 4, and a rear cross-bar 14 disposed at a rear portion of the roof rails 4 may be mounted to the vehicle roof-box 100 at the front, middle, and rear portions of the vehicle roof-box 100, thereby to firmly secure the vehicle roof-box 100 to the vehicle panel 2.

That is, conventionally, only front and rear cross-bars are disposed to the roof rails. Thus, the front and rear cross-bars are mounted to the vehicle roof-box at the front and rear portions thereof. However, in the present disclosure, the middle cross-bar is further added to achieve more rigid securement of the vehicle roof-box to the vehicle panel.

Each of the cross-bars 10, 12 and 14 may have substantially the same curvature as that of the vehicle roof panel 2. In this way, each of the cross-bars 10, 12 and 14 may tightly contact the vehicle roof panel 2.

When each of the cross-bars 10, 12 and 14 may tightly contact the vehicle roof panel 2, a gap between the vehicle roof panel 2 and cross-bars 10, 12 and 14 may be removed, thereby to minimize the air resistance or a noise during the vehicle is running.

In order to fasten the cross-bars 10, 12 and 14 to the roof rails 4, each of the bar may have a fixing plate 16 at each end thereof, wherein the fixing plate may be face-coupled to a corresponding securing means 8. The fixing plate 16 may have a larger area size than a cross-sectional area of each of the cross-bars 10, 12 and 14. Each hole 18 may be formed in the fixing plate 16 and thus, a fastener 30 such as a bolt may be inserted through the hole 18 to secure each of the cross-bars 10, 12 and 14 to the securing means 8.

The fixing plate 16 may have a bent portion 20 bent outwardly from an upper portion of the plate 16. Thus, the bent portion 20 may be supported on the securing means 8. In this way, the bent portion 20 may allow each of the cross-bars 10, 12 and 14 to be more reliably secured to the securing means 8.

Each end of each of the cross-bars 10, 12 and 14 may be integrated with the fixing plate 16 on the lower portion thereof. A bottom of each of the cross-bars 10, 12 and 14 may tightly-contact the top face of the vehicle roof panel 2.

The vehicle roof-box 100 may be mounted to the cross-bars 10, 12 and 14. In this connection, front and rear ends of the vehicle roof-box 100 may be spaced from the front cross-bar 10 and rear cross-bar 14. Thus, the vehicle roof-box 100 may not be supported by the bars on some of front and rear portions of the box 100.

Further, there may be gaps between the front and rear bottoms of the vehicle roof-box 100 and the vehicle roof panel 2. During the vehicle is running, the air may enter the gaps to generate a noise. Further, at the start or stop of the vehicle, the vehicle roof-box may deform at the rear and front ends thereof due to the gaps. Thus, in order to address the above problems, reinforcement supports 22 and 24 may be provided to the front cross-bar 10 and rear cross-bar 14 respectively.

As shown in FIG. 3, the reinforcement support 22 extending from the front cross-bar 10 may include two side supports 22a extending from the front cross-bar 10 at both ends thereof in a front direction to support front lateral portions of the vehicle roof-box 100, and a front support 22b to connect the side supports 22a to support the vehicle roof-box 100 at a front end of thereof.

The front support 22b may have a bridge 22c to allow support reinforcement. The bridge 22c may extend between centers of the front support 22b and front cross-bar 10 as shown in FIG. 3. In an alternative, the bridge 22c may extend between any point of the front support 22b and any point of the front cross-bar 10.

Although one bridge 22c extends between the front support 22b and front cross-bar 10, the present disclosure is not limited thereto. At least two bridges 22c may extend between the front support 22b and front cross-bar 10.

Each of the side support 22a, front support 22b, and bridge 22c may have substantially the same curvature as that of the vehicle roof panel 2 and may tightly-contact the roof panel 2.

As shown in FIG. 5, the middle cross-bar 12 may have substantially the same curvature as that of a middle transverse curvature of the vehicle roof panel 2 and may tightly-contact the roof panel 2 on the middle transverse portion thereof.

As shown in FIG. 7, the reinforcement support 24 extending from the rear cross-bar 10 may include two side supports 24a extending from the rear cross-bar 10 at both ends thereof in a rear direction to support rear lateral portions of the vehicle roof-box 100, and a rear support 24b to connect the side supports 24a to support the vehicle roof-box 100 at a rear end of thereof.

The rear support 24b may have a bridge (not shown) to allow support reinforcement. The bridge 24c may extend between centers of the rear support 24b and rear cross-bar 10 as shown in FIG. 7. In an alternative, the bridge may extend between any point of the rear support 24b and any point of the rear cross-bar 10.

Each of the side support 24a, rear support 24b, and bridge may have substantially the same curvature as that of the vehicle roof panel 2 and may tightly-contact the roof panel 2.

The reinforcement supports 22 and 24 extending from the front cross-bar 10 and rear cross-bar 14 respectively may allow the front and rear portions of the vehicle roof-box 100 to be reliably supported on the reinforcement support 22 and 24, thereby to achieve more rigid securement of the vehicle roof-box 100.

The reinforcement supports 22 and 24 may block a space between the vehicle roof-box 100 and vehicle roof panel 2 from an ambient air. Thus, when the vehicle is running, a noise may not be generated therein.

Multiple pins 26 may be disposed upwardly on the cross-bars 10, 12 and 14 and reinforcement supports 22 and 24. Thus, the vehicle roof-box 100 may have holes defined therein to receive the pins 26, as shown in FIG. 10. This may secure the vehicle roof-box 100 to the cross-bars.

Protective pads 28 may be formed beneath the cross-bars 10, 12 and 14 and reinforcement support 22 and 24, thereby to protect the vehicle roof panel 2 from a scratch from the cross-bars 10, 12 and 14. The protective pad 28 may function to prevent a scratch noise from the cross-bars 10, 12 and 14 contacting the vehicle roof panel 2 during the vehicle is running. For this purpose, the protective pad 28 may be made of an elastic material having a predetermined elasticity, for example, a urethane or rubber material.

The protective pad 28 may be disposed on entire bottom faces of the cross-bars 10, 12 and 14 and reinforcement supports 22 and 24 or may be partially disposed beneath the cross-bars 10, 12 and 14 and reinforcement supports 22 and 24 as shown in FIGS. 9 and 10.

Each of the cross-bars 10, 12 and 14 may be secured to the roof rails 4 via the securing means 8. The securing means 8 may include a first bracket 8a hooked and supported on each of the roof rails 4 at an outer portion of the rail 4, and a second bracket 8b hooked and supported on each of the roof rails 4 at an inner portion of the rail 4, wherein the second bracket 8b is removably coupled to the first bracket 8a via a fastener 32 such as a bolt.

The first bracket 8a may have an inner shape corresponding to the outer shape of each of the roof rails 4 at an outer portion thereof. The second bracket 8*b* may have an inner shape corresponding to the outer shape of each of the roof rails 4 at an inner portion thereof.

The second bracket 8*b* may have a most-inner vertical face to face-contact the fixing plate 16 fixed to end of each of the cross-bars 10, 12 and 14.

In order to secure the first and second brackets 8*a* and 8*b* to each of the roof rails 4, the first bracket 8*a* may have a first hole through which a fastener 32 is inserted, and the second bracket 8*b* may have a second hole through which the fastener 32 is inserted.

In order to maintain engagement between the first and second brackets 8*a* and 8*b*, for example, the first and second brackets 8*a* and 8*b* may have a groove 34*a* and protrusion 34*b* respectively, wherein the groove 34*a* may be engaged with the protrusion 34*b*. Otherwise, the second and first brackets 8*b* and 8*a* may have a groove 34*a* and protrusion 34*b* respectively, wherein the groove 34*a* may be engaged with the protrusion 34*b*.

The engagement between the groove 34*a* and protrusion 34*b* may allow more rigid securement between the first and second brackets 8*a* and 8*b*. The engagement between the groove 34*a* and protrusion 34*b* may further allow adjustment of a spacing between the first and second bracket 8*a* and 8*b* to be adapted to the width of each of the roof rails 4.

To assembly the above components, while the first and second brackets 8*a* and 8*b* are separated from each other, the first and second brackets 8*a* and 8*b* are attached to each of the roof rails 4 toward the outer and inner portions thereof, and the groove 34*a* and protrusion 34*b* are engaged with each other. Subsequently, using the fastener 32, the first and second brackets 8*a* and 8*b* may be securely coupled to each other.

Thus, the first and second bracket 8*a* and 8*b* wrap each of the roof rails 4, and the groove 34*a* and protrusion 34*b* of the first and second bracket 8*a* and 8*b* may be further engaged with each other while a spacing between the first and second bracket 8*a* and 8*b* is adapted to the width of each of the roof rails 4.

When one of the roof rails 4 is secured to the first and second brackets 8*a* and 8*b*, the other of the roof rails 4 may be secured to further securing means 8 in the same manner.

In this way, for all of the cross-bars, corresponding securing means 8 secures the cross-bars 10, 12 and 14 to the roof rails 4. Then, the pins 26 formed on the cross-bars 10, 12 and 14 and reinforcement support 22 and 24 may be fitted into holes (not shown) defined in the vehicle roof-box 100.

After the securing means 8 is coupled to both roof rails 4, the bent portion 20 of the fixing plate 16 fixed to each end of each of the cross-bars 10, 12 and 14 may be laid on the second bracket 8*b* and the fixing plate 16 may be pushed toward the second bracket 8*b*.

Then, the fastener 30 may be inserted through the hole 18 defined in the fixing plate 16 and may be engaged into a threaded hole defined in the second bracket 8*b*. Thus, a single cross-bar may be secured to the rails 4. Then, remaining cross-bars may be secured to the rails 4 in the same way.

In the present disclosure, without forming a hole or groove in the roof rails 4, the securing means 8 may be secured to the rails 4. Thus, this may prevent a damage of the roof rails and, thus, the strength of the roof rails may not be deteriorated.

Then, the pins 26 formed on the cross-bars 10, 12 and 14 and reinforcement support 22 and 24 may be fitted into holes (not shown) defined in the vehicle roof-box 100. In this way, the vehicle roof-box 100 may be structured such that the lower plate 110 of the vehicle roof-box 100 may be recessed in contact regions thereof with the cross-bars 10, 12 and 14 and reinforcement supports 22 and 24. Thus, when the vehicle roof-box 100 is seated on the cross-bars 10, 12 and 14 and reinforcement supports 22 and 24, the cross-bars 10, 12 and 14 and reinforcement supports 22 and 24 may be received in the recesses defined in the lower plate 110 of the vehicle roof-box 100. Thus, when the vehicle roof-box 100 is seated on the cross-bars 10, 12 and 14 and reinforcement supports 22 and 24, there may be no gaps therebetween.

The vehicle roof-box 100 has knob handles 130 protruding inwardly from the lower plate 110 of the vehicle roof-box 100. Thus, the upper plate 120 may be opened and the knob handles 130 may be rotated to be secured to the pins 26 in a screw manner. The lower plate 110 of the vehicle roof-box 100 may be secured to the cross-bars 10, 12 and 14. Thus, the vehicle roof-box 100 may be secured to the cross-bars 10, 12 and 14 and reinforcement support 22 and 24.

The front, and rear and middle portions of the vehicle roof-box 100 may be secured to the front cross-bar 10 and rear cross-bar 14 and middle cross-bar 12 respectively.

The reinforcement supports 22 and 24 of the front cross-bar 10 and rear cross-bar 14 may support the front and rear portions of the vehicle roof-box 100 respectively. Thus, the vehicle roof-box 100 may be firmly secured to the bars.

A space between the vehicle roof-box 100 and vehicle roof panel 2 may be blocked by the reinforcement supports 22 and 24 at the front and rear ends of the vehicle roof-box 100. A side face of the lower plate 110 of the vehicle roof-box 100 may contact the side face of the bracket 8. The lower plate 110 of the vehicle roof-box 100 may contact the top face of the bracket 8. Thus, during the vehicle is running, the air may be prevented from entering into between the lower plate 110 of the vehicle roof-box 100 and the bracket 8, thereby to remove or reduce a noise.

That is, a joint portion between the first bracket 8*a* and second bracket 8*b*, and joint portions between the second bracket 8*b* and cross-bars 10, 12 and 14 may not be exposed to an ambient air by the lower plate 110 of the vehicle roof-box 100, thereby to remove or reduce a noise.

Further, the protective pad 28 beneath the cross-bars 10, 12 and 14 and reinforcement support 22 and 24 may suppress a scratch for the vehicle roof panel 2 due to a vibration during the vehicle is running. Thus, the damage of the vehicle roof panel 2 and/or a noise resulting from the scratch may be suppressed.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

What is claimed is:

1. A assembly for mounting a vehicle roof-box on a vehicle roof panel, the assembly comprising:
    a pair of roof rails disposed on the vehicle roof panel at both sides thereof respectively in a front-rear direction of the vehicle roof panel;
    a plurality of cross-bars spacedly arranged in the front-rear direction, wherein each cross-bar has two opposing ends removably coupled to the roof rails respectively, wherein the vehicle roof-box is mounted to the cross-bars; and
    a plurality of securing means configured to removably secure the cross-bars to the roof rails, wherein a bottom face curvature of each of the cross-bars is substantially the same as a surface curvature of the vehicle roof panel, wherein the cross-bars are tightly coupled to the vehicle roof panel, wherein each of the plurality of securing means includes a first bracket movable along each of the roof rails, and a second bracket screw-coupled to the first bracket to secure the first bracket to each of the roof rails, wherein an end of each of the cross-bars is fixed to the second bracket, wherein a lower portion of the vehicle roof-box contacts the first bracket such that joints between the plurality of securing means and the plurality of cross-bars are not exposed to an ambient air, wherein each of the cross-bars secured to the roof rails at a front and/or rear portion thereof includes a reinforcement support to support a front and/or rear end of the vehicle roof-box, wherein protective pads are disposed beneath the cross-bars and the reinforcement supports, wherein each of the cross-bars has a fixing plate at each end of the bar, wherein the fixing plate face-contacts and is fixed to the second bracket.

2. The assembly of claim 1, wherein the cross-bars include a front cross-bar secured to a front portion of each of the roof rails, a middle cross-bar secured to a middle portion of each of the roof rails, and a rear cross-bar secured to a rear portion of each of the roof rails.

3. The assembly of claim 1, wherein the cross-bars and reinforcement supports have pins formed thereon, wherein the vehicle roof-box has holes defined therein to receive the pins, and knob handles disposed in the vehicle roof-box are screw-engaged with the pins.

4. A assembly for mounting a vehicle roof-box on a vehicle roof panel, the assembly comprising:
- a pair of roof rails disposed on the vehicle roof panel at both sides thereof respectively in a front-rear direction of the vehicle roof panel;
- a plurality of cross-bars spacedly arranged in the front-rear direction, wherein each cross-bar has two opposing ends removably coupled to the roof rails respectively, wherein the vehicle roof-box is mounted to the cross-bars;
- a plurality of securing means configured to removably secure the cross-bars to the roof rails; and
- at least one reinforcement support to support a front and/or rear end of the vehicle roof-box, wherein each of the plurality of the securing means includes a first bracket hooked and supported on each of the roof rails at an outer portion thereof, and a second bracket hooked and supported on each of the roof rails at an inner portion thereof, wherein the second bracket is removably coupled to the first bracket via a fastener, wherein one of the first and second brackets has a groove and the other of the first and second brackets has a protrusion engaged with the groove, wherein a bottom face curvature of each of the cross-bars is substantially the same as a surface curvature of the vehicle roof panel, wherein the cross-bars are tightly coupled to the vehicle roof panel, wherein a bottom face curvature of each of the reinforcement supports is substantially the same as a surface curvature of the vehicle roof panel, wherein the reinforcement supports are tightly coupled to the vehicle roof panel, wherein protective pads are disposed beneath the cross-bars and the reinforcement support, wherein each of the cross-bars has a fixing plate at each end of the bar, wherein the fixing plate face-contacts and is fixed to the second bracket.

5. The assembly of claim 4, wherein the cross-bars include a front cross-bar secured to a front portion of each of the roof rails, a middle cross-bar secured to a middle portion of each of the roof rails, and a rear cross-bar secured to a rear portion of each of the roof rails.

6. The assembly of claim 4, wherein the cross-bars and reinforcement support have pins formed thereon, wherein the vehicle roof-box has holes defined therein to receive the pins, and knob handles disposed in the vehicle roof-box are screw-engaged with the pins.

* * * * *